United States Patent [19]

Rathbone

[11] 4,422,590
[45] Dec. 27, 1983

[54] STUB SHAFT

[75] Inventor: James W. Rathbone, Waynesville, N.C.

[73] Assignee: Champion International Corporation, Stamford, Conn.

[21] Appl. No.: 302,980

[22] Filed: Sep. 17, 1981

[51] Int. Cl.³ ........................ B23B 5/22; B23B 31/40; B65H 75/18
[52] U.S. Cl. .............................. 242/68.3; 242/72 R; 279/2 R
[58] Field of Search ................... 242/68.1, 68.3, 72 R, 242/129.5; 279/2 R

[56] References Cited

U.S. PATENT DOCUMENTS

| | | | |
|---|---|---|---|
| 1,429,556 | 9/1922 | Bartholdy | 279/2 X |
| 1,716,812 | 5/1929 | Ball | 242/68.3 X |
| 2,564,746 | 8/1951 | Bauer | 242/68.3 |
| 2,638,282 | 5/1953 | Prevost | 242/72 |
| 2,733,022 | 1/1956 | Grody | 242/72 |
| 2,746,497 | 5/1956 | Thompson | 279/2 X |
| 3,462,092 | 8/1969 | Mullins | 242/68.1 X |
| 4,154,412 | 5/1979 | Briar et al. | 242/72 R X |

Primary Examiner—Stuart S. Levy
Assistant Examiner—Lloyd D. Doigan
Attorney, Agent, or Firm—Evelyn M. Sommer

[57] ABSTRACT

A stub shaft comprising a hollow shaft having a pair of resilient rubber gripping rings mounted thereon. Each resilient gripping ring is mounted between a chuck and a pressure plate. Pressure bars hold the pressure plates in spaced but operative relationship to each other. One of the chucks is slidable on the shaft and a thrust cone is provided to apply pressure to the slidable chuck. This applies pressure to both resilient gripping rings to compress the rings and allow them to expand so as to grip the inner surface of a paper roll core.

3 Claims, 3 Drawing Figures

STUB SHAFT

BACKGROUND OF THE INVENTION

The present invention relates to a stub shaft and more particularly to an improved stub shaft for use in supporting paper rolls.

Stub shafts are widely used in sheeting of rolled paper stock. Such stub shafts have been used for a number of years and are relatively lightweight which permit them to be used without any special lifting equipment. One type of stub shaft which has been used utilizes an expanding leaf element. However, this type of stub shaft has an excess number of parts, many of which must be separately cast and which have a high maintenance cost. It has also been found that with existing stub shafts, slipping sometimes occurs in the core which results in damage to the core and/or loss of the paper roll. Stub shafts with expandable rubber shafts have also been used but these also require numerous parts and high maintenance cost and are adapted for use with four inch cores only.

SUMMARY OF THE INVENTION

The present invention overcomes the above disadvantages and provides an improved stub shaft which has a minimum of parts.

Another object of the present invention is the provision of an improved stub shaft which has lower maintenance costs.

Another object of the present invention is the provision of an improved stub shaft which permits the shaft to grip the roll core equally at all contact points.

Another object of the present invention is the provision of an improved stub shaft in which the gripping action of the shaft is controlled from a single point.

Another object of the present invention is the provision of an improved stub shaft which can be made in any desirable length and have core-gripping means of any diameter.

Other and further objects of the invention will be obvious upon an understanding of the illustrative embodiment about to be described, or will be indicated in the appended claims, and various advantages not referred to herein will occur to one skilled in the art upon employment of the invention in practice.

The objects of the present invention are accomplished by the use of a hollow shaft having a stationary chuck and a slidable chuck mounted thereon. A pair of compressible rubber gripping rings are mounted adjacent each chuck. Pressure plates are mounted on the other side of the rings so that each ring is interposed between a pressure plate and a chuck. A thrust cone is threadably mounted on a rod which extends through the hollow shaft. The thrust surface of the thrust cone bears against the slidable chuck so that rotation of the rod in the one direction tightens the thrust cone to apply pressure to the slidable chuck to move the chuck inwardly and thereby apply pressure to the gripping rings. The gripping rings are compressed so that their outer surfaces bulge outwardly to grip the inner surface of the paper roll core. Rotation of the rod in the opposite direction will release the thrust cone and the pressure on the slidable chuck to decompress the gripping rings, allow them to assume their natural position and release their grip on the inner surface of the core.

BRIEF DESCRIPTION OF THE DRAWINGS

A preferred embodiment of the invention has been chosen for purposes of illustration and description and is shown in the accompanying drawings forming a part of the specification, wherein.

DETAILED DESCRIPTION OF THE INVENTION

Figure 1:
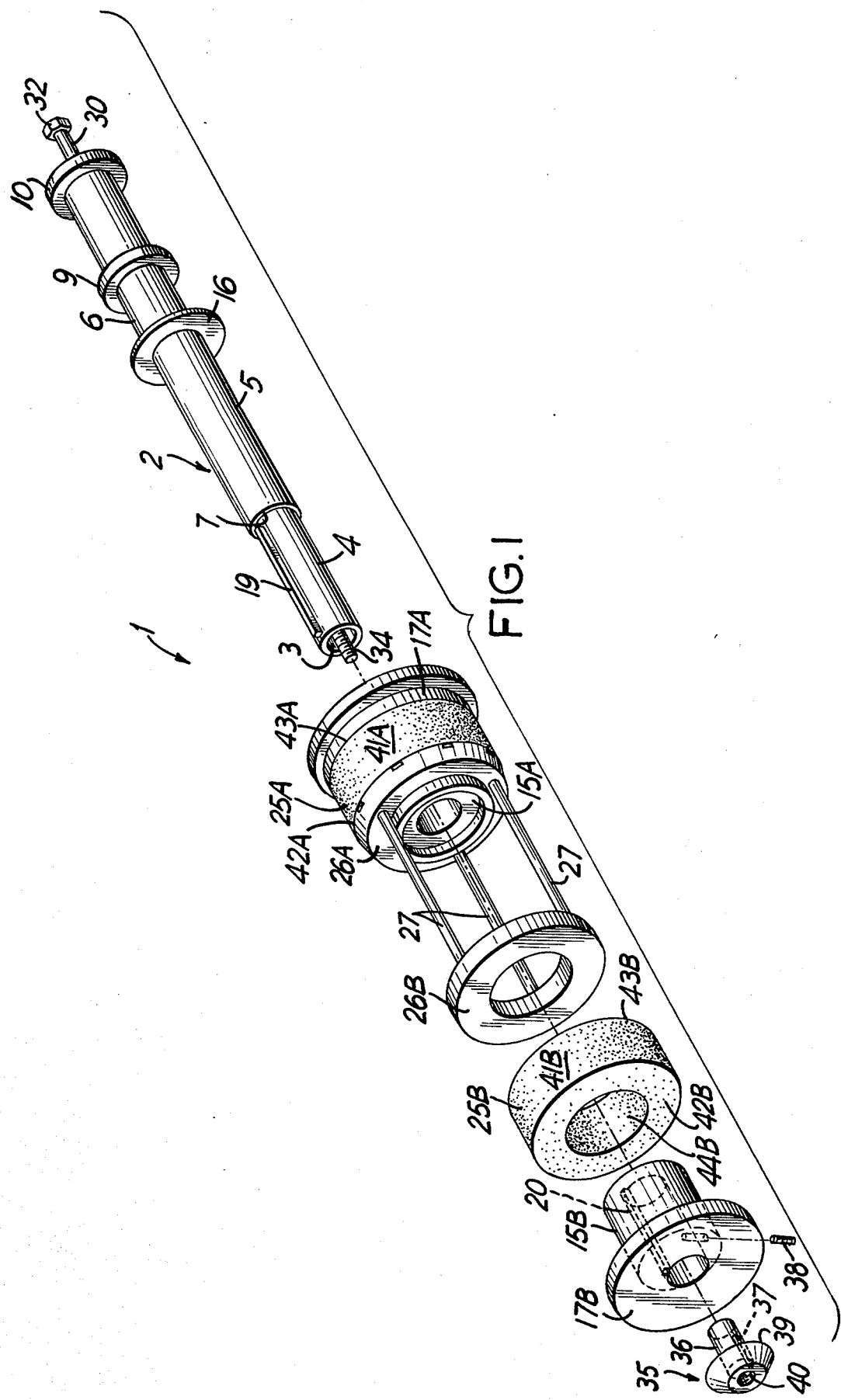
FIG. 1 is an exploded perspective view of the stub shaft made in accordance with the present invention.

Referring to the drawings, the stub shaft assembly 1 of the present invention comprises a hollow shaft 2 having a central opening 3 extending therethrough. The outer surface of the shaft 1 comprises a small diameter front surface 4, an intermediate diameter central surface 5 and a large diameter rear surface 6. The different diameter surfaces of the shaft 2 form shoulders 7 and 8. Spaced journal sleeves 9 and 10 are mounted on the rear surface 6 of shaft 2.

A rear stationary chuck 15A is mounted on the central shaft surface 5. A thrust bearing 16 is interposed between the chuck 15A and the shoulder 8. The rear chuck 15A has a flange 17A extending outwardly from its rear end. A front chuck 15B is slidably mounted on front shaft surface 4 and is keyed thereto by means of a key 19 in a slot 20 in the front chuck 15B. The front chuck 15B has a flange 17B extending outwardly from its front end.

Rear and front compressible rubber gripping rings 25A and 25B are mounted on each chuck 15A and 15B, respectively. The gripping rings 25A and 25B are of the same diameter and thickness, are resilient and are preferably 70 durometer solid rubber rings. Pressure rings 25A and 25B have outer surfaces 41A and 41B as well as front surfaces 42A and 42B and rear surfaces 43A and 43B and are provided with a central opening 44A and 44B.

Rear and front pressure plates 26A and 26B, respectively, are slidably mounted on the chucks 15A and 15B adjacent the gripping rings 25A and 25B on the sides thereof opposite the chuck flanges 17A and 17B so that pressure plates 26A and 26B face each other. Thus, each pressure ring 25A and 25B is interposed between its respective pressure plates 26A and 26B and chuck flanges 17A and 17B. Pressure rods 27 are provided between pressure plates 26A and 26B to operatively connect the pressure plates 26A and 26B together so that the pressure plates 26A and 26B and the pressure rods 27 may be moved as a unit. Preferably, three pressure rods 27 are shown in the drawings, however, the number of pressure rods 27 used may vary, if desired.

A threaded rod 30 having a thrust bearing 31 and a nut 32 at its rear end is mounted within the opening 3 of the hollow shaft 2. The nut 32 and the thrust bearing 31 lie in a countersunk portion 33 of the opening 3 in the hollow shaft 2. The opposite or front end of the rod 30 is threaded at 34 to receive a thrust cone 35 having a rearward extension 36 with a threaded bore 40 which is keyed by slot 37 and bolt 38 to the shaft 2 and the chuck 15B. The threaded bore 40 of the thrust cone 35 is adapted to receive the threaded front end 34 of the shaft 35. The thrust cone 34 has a bearing surface 39 which bears against the front surface of the slidable chuck 15B. It will be noted that when the rod 30 is rotated in one direction, such as by applying a wrench to nut 32, the thrust cone 35 is moved inwardly to cause its thrust surface 39 to apply pressure to the sliding chuck 15B and rotating the rod 30 in the opposite direction will release the pressure that the thrust surface 39 of the thrust cone 35 applies to the chuck 15B.

Figure 3:
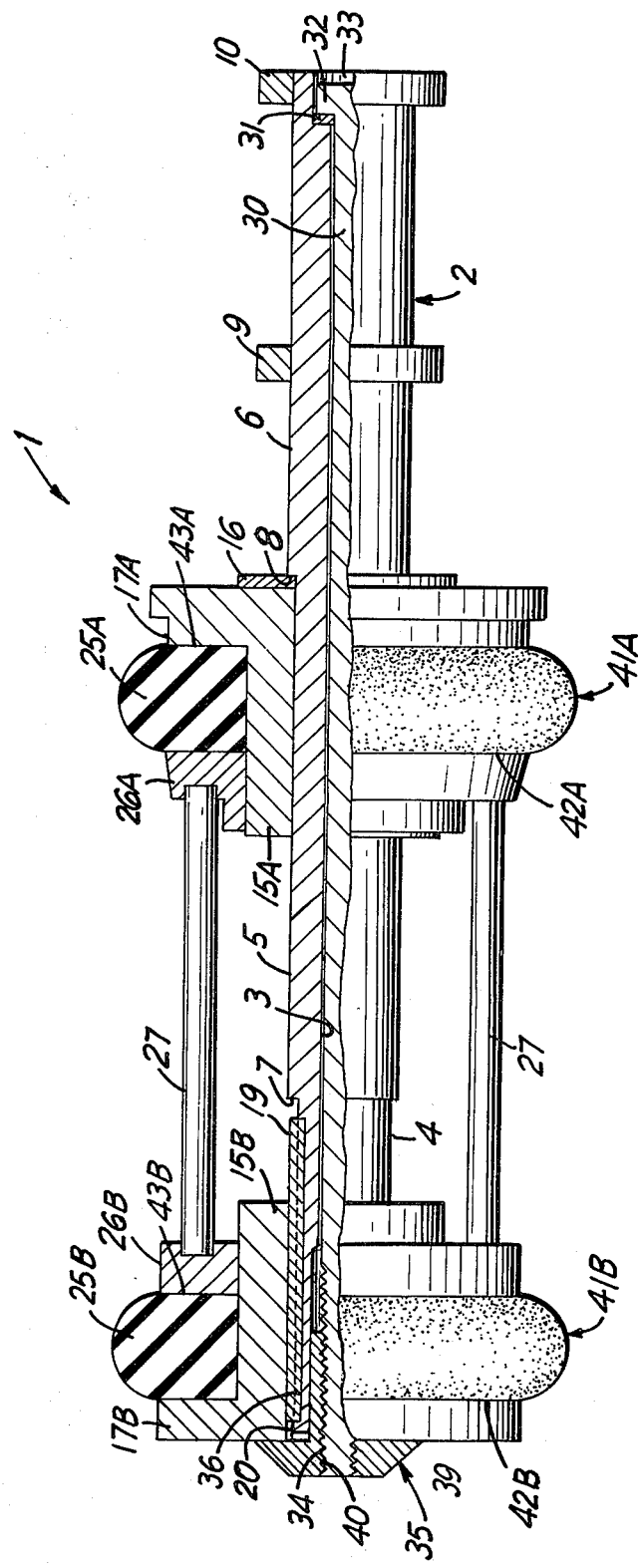
FIG. 3 is an elevational view similar to FIG. 2 showing the stub shaft in its operative roll-gripping position.

When in use, the stub shaft 1 is mounted within the core of a paper roll (not shown) and the thrust cone 35 is tightened by rotating the rod 30 in one direction so as to move the thrust cone 35 rearwardly by the action of the threaded end 34 of rod 30 on the threaded bore 40 of thrust cone 35. This causes the thrust surface of thrust cone 35 to apply rearward pressure to the sliding chuck 15B. Tightening of the thrust cone 35 will move the sliding chuck 15B rearwardly to cause its flange 17B to apply pressure to the side surface 42B of front gripping ring 25B which, in turn, applies pressure to and moves the front pressure plate 26A rearwardly through side surface 43B of gripping ring 25B. Pressure is applied to rear pressure plate 26A by pressure rods 27 which pressure plate 26A then is moved rearwardly against the side surface 42A of rear gripping ring 25A which, in turn, is squeezed against and applies pressure to the flange 17A of the rear stationary chuck 15A through its side surface 43A. Thus, the gripping rings 25A and 25B are compressed between the flanges 17A-17B (of chucks 15A-15B) and the pressure plates 26A-26B so that the outer surfaces 41A and 41B thereof will bulge outwardly (FIG. 3) and apply pressure to the inner surfaces of the core of the paper roll (not shown). In this position, the paper roll may then be used and manipulated in any desired manner.

Figure 2:
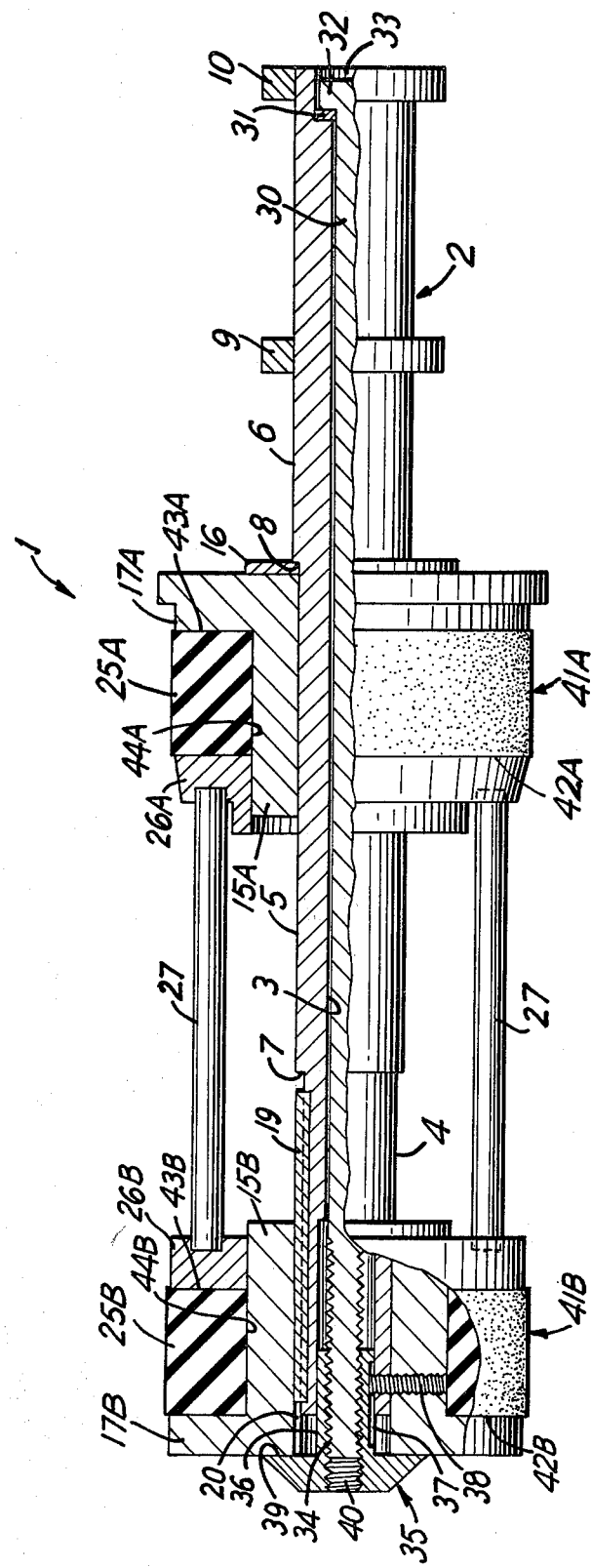
FIG. 2 is an elevational view, partly in section, thereof showing the stub shaft in its inoperative position.

When the stub shaft 1 is to be removed from the paper roll core, the rod 30 is rotated in the opposite direction to move the thrust cone 35 outwardly toward the front to release the pressure on the gripping rings 25A and 25B so that the gripping rings are decompressed and assume their natural position (FIG. 2) away from the inner surface of the core of the paper roll to release the roll and permit the stub shaft to be removed.

It will thus be seen that the present invention provides an improved stub shaft which has a minimum of moving parts, which has lower maintenance costs, which expands equally to permit equal gripping power simultaneously from a single point and which can be made in any desirable length and have chucks of any diameter.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A stub shaft assembly comprising:
   (a) a hollow shaft having a through bore;
   (b) a fixed chuck removably mounted on said shaft, said fixed chuck having an outer circumferential portion having a smooth surface and a radially outwardly extending flange disposed adjacent to said outer circumferential portion of said fixed chuck;
   (c) a first elastomeric gripping ring mounted on said outer circumferential portion of said fixed chuck;
   (d) a first pressure plate mounted on said outer circumferential portion of said fixed chuck whereby said first elastomeric gripping ring is sandwiched between said first pressure plate and said flange on said fixed chuck;
   (e) a sliding chuck removably slidably mounted on said hollow shaft, said sliding chuck having an outer circumferential portion having a smooth surface and a radially outwardly extending flange disposed adjacent to said outer circumferential portion of said sliding chuck;
   (f) a second elastomeric gripping ring mounted on said outer circumferential portion of said sliding chuck;
   (g) a second pressure plate mounted on said outer circumferential portion of said sliding chuck whereby said second elastomeric gripping ring is sandwiched between said second pressure plate and said flange on said sliding chuck;
   (h) means keying said sliding chuck to said hollow shaft to allow reciprocal sliding movement of said sliding chuck on said hollow shaft while preventing rotational movement of said sliding chuck on said hollow shaft;
   (i) a thrust member mounted in a bore in said sliding chuck, said thrust member having a threaded bore and having a thrust surface bearing against an end surface of said sliding chuck;
   (j) means keying said thrust member to said sliding chuck to prevent said thrust member from rotating within said sliding chuck bore;
   (k) a rod disposed in said through bore in said hollow shaft, said rod having a threaded end which threadedly engages said threaded bore in said thrust member, and said rod also having an opposite profiled end which enables rotation of said rod within said through bore of said hollow shaft;
   (l) force transmitting means extending between opposed surfaces of said first and second pressure plates; and
   (m) rotation of said rod in one direction being operable through said thrust member to move said sliding chuck toward said fixed chuck to cause said pressure plates to compress said elastomeric gripping rings axially by reason of said force transmitting means whereby the outer diameters of said gripping rings are expanded.

2. The stub shaft of claim 1 wherein said force transmitting means comprises a plurality of rods extending between said opposed surfaces of said pressure plates.

3. The stub shaft of claim 1, wherein said hollow shaft includes a radially outwardly extending shoulder formed thereon and further comprising a thrust bearing mounted on said hollow shaft in contact with said shoulder to provided stop means for holding said fixed chuck against movement in one direction on said hollow shaft.

* * * * *

UNITED STATES PATENT AND TRADEMARK OFFICE
CERTIFICATE OF CORRECTION

PATENT NO. : 4,422,590
DATED : December 27, 1983
INVENTOR(S) : JAMES W. RATHBONE It is certified that error appears in the above—identified patent and that said Letters Patent is hereby corrected as shown below:

Col. 2, line 68, delete "35" and insert in lieu thereof -- 30 -- ;

Col. 2, line 68, delete "34" and insert in lieu thereof -- 35 -- ;

Col. 4, line 60, delete "provided" and insert in lieu thereof -- provide -- .

Signed and Sealed this

Seventeenth Day of July 1984

[SEAL]

*Attest:*

*Attesting Officer*

GERALD J. MOSSINGHOFF

*Commissioner of Patents and Trademarks*